US011153025B2

United States Patent
Lazzaro et al.

(10) Patent No.: US 11,153,025 B2
(45) Date of Patent: Oct. 19, 2021

(54) RANDOMLY-MODIFIED FIRST NETWORK TO SECOND NETWORK COMMUNICATION

(71) Applicant: The Government of the United States, as represented by the Secretary of the Army, Washington, DC (US)

(72) Inventors: Matthew Lazzaro, Churchville, MD (US); William Toth, Ocean, NJ (US)

(73) Assignee: The Government of the United States, as represented by the Secretary of the Army, Washington, DC (US)

( * ) Notice: Subject to any disclaimer, the term of this patent is extended or adjusted under 35 U.S.C. 154(b) by 707 days.

(21) Appl. No.: 15/933,931

(22) Filed: Mar. 23, 2018

(65) Prior Publication Data

US 2019/0296852 A1    Sep. 26, 2019

(51) Int. Cl.
*H04W 12/03*     (2021.01)
*H04K 1/00*     (2006.01)

(52) U.S. Cl.
CPC .............. *H04K 1/00* (2013.01); *H04W 12/03* (2021.01); *H04L 2209/80* (2013.01)

(58) Field of Classification Search
CPC ..... H04W 12/00; H04W 12/02; H04W 12/03; H04L 2209/80; H04K 1/00; H04K 1/02; H04K 1/025
See application file for complete search history.

(56) References Cited

U.S. PATENT DOCUMENTS

| 3,808,536 | A | * | 4/1974 | Reynolds | ................. | H04K 1/02 380/45 |
| 3,893,031 | A | * | 7/1975 | Majeau | ..................... | H04K 1/02 380/274 |
| 3,925,730 | A | * | 12/1975 | de Rosa | ................... | H04K 1/02 380/35 |
| 2017/0026146 | A1 | * | 1/2017 | Tollefson | ................. | H04K 1/10 |

* cited by examiner

*Primary Examiner* — Minh Dinh
(74) *Attorney, Agent, or Firm* — Ronald Krosky

(57) ABSTRACT

Various embodiments are described that relate to random noise addition to a communication. A first secure network can employ a first encryption scheme and a second secure network can employ a second encryption scheme. In order to communicate between the first secure network and the second secure network such that the schemes are not decipherable, random noise can be added to a communication designated to transfer from the first secure network to the second secure network.

20 Claims, 18 Drawing Sheets

RANDOMLY-MODIFIED FIRST NETWORK TO SECOND NETWORK COMMUNICATION

GOVERNMENT INTEREST

The innovation described herein may be manufactured, used, imported, sold, and licensed by or for the Government of the United States of America without the payment of any royalty thereon or therefor.

BACKGROUND

A pair of radios can attempt to transmit voice communications between one another. While some voice communications can be benign, others can be sensitive in nature. Due to this sensitivity, the radios can try to protect the transmission of these voice communications. If the radios are part of a secure network, then they can employ an encryption scheme. However, if the radios are not part of a secure network, then they may not be able share an encryption scheme and not have an encryption scheme option for radio-to-radio communications.

SUMMARY

In one embodiment, a system, that is at least partially hardware, comprises a reception component, an addition component, and a transmission component. The reception component can be configured to receive a non-encrypted voice communication from a first secure radio network. The addition component can be configured to add random noise to the non-encrypted voice communication from the first secure radio network such that a first secure radio network-based noise-added non-encrypted voice communication is produced. The transmission component can be configured to transmit the first secure radio network-based noise-added non-encrypted voice communication to a second secure radio network.

In another embodiment, a system, that can be part of a first secure network, can comprise a reception component, an encryption component, and a transmission component. The reception component can be configured to receive a randomly-modified second secure network-based non-encrypted voice communication by way of a non-encrypted communication channel. The encryption component can be configured to encrypt, according to a first network encryption scheme, the randomly-modified second secure network-based non-encrypted voice communication into an encrypted first secure network voice communication. The transmission component can be configured to transmit the encrypted first secure network voice communication along the first secure network. The randomly-modified second secure network-based non-encrypted voice communication can be derived from an encrypted second secure network voice communication from a second secure network. The first secure network and the second secure network can be distinct networks. The encrypted second secure network voice communication can be encrypted in accordance with a second network encryption scheme. The first network encryption scheme and the second network encryption scheme can be different encryption schemes.

In yet another embodiment, a system configured to be part of a first secure network comprises a reception component, a decryption component, and a transmission component. The reception component can be configured to receive an encrypted first secure network voice communication with an intended destination of a second secure network. The decryption component can be configured to decrypt the encrypted first secure network voice communication with the intended destination of the second secure network into a decrypted first secure network voice communication. The transmission component can be configured to transmit the decrypted first secure network voice communication to a communication modification component. At the communication modification component, the decrypted first secure network voice communication can be randomly-modified to produce a randomly-modified decrypted first secure network voice communication. The randomly-modified decrypted first secure network voice communication can be transferred to the second secure network. The first secure network can employ a first encryption scheme, the second secure network can employ a second encryption scheme, and the first encryption scheme and the second encryption schemes can be different schemes.

BRIEF DESCRIPTION OF THE DRAWINGS

Incorporated herein are drawings that constitute a part of the specification and illustrate embodiments of the detailed description. The detailed description will now be described further with reference to the accompanying drawings as follows.

DETAILED DESCRIPTION

Figure 1:
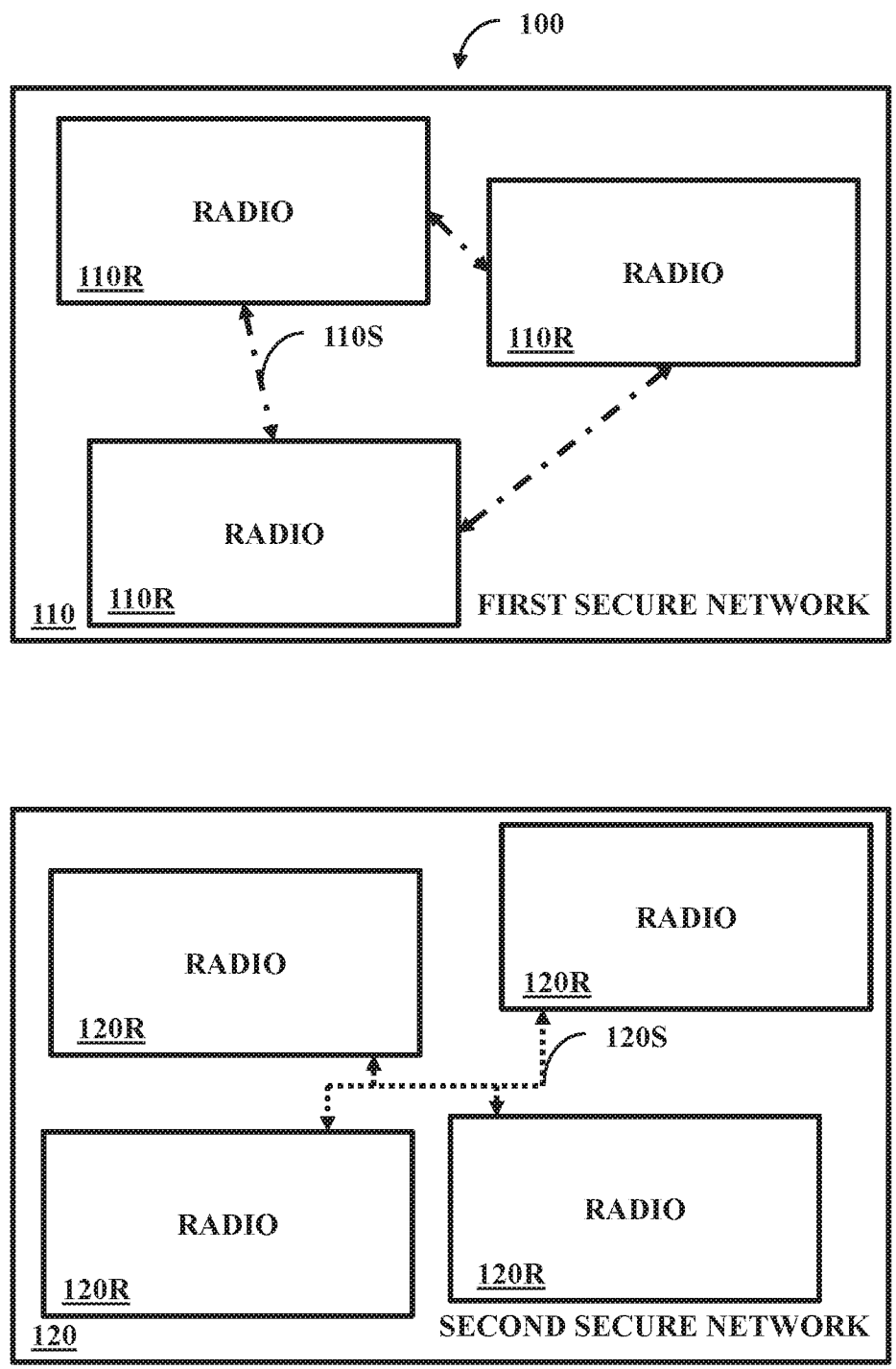
FIG. 1 illustrates one embodiment of a communication environment comprising a first secure network and a second secure network.

Instances can occur in wireless communication where a first party wants to give access to a second party to the first party's network. However, this access is not full access, but partial access. In one example, two military forces from different nations can have a desire to communicate with one another during a joint operation. While the nations may be friendly, for security reasons it may be best to not give full access to each other's networks.

Therefore, an intermediary communications module can be used to facilitate this partial access. In one example, a voice communication from the first party's network can be decrypted and sent to the intermediary communications module. Noise, such as non-audible white noise, can be added to the voice communication and then the communication can be sent to the second party's network to be encrypted in accordance with the second party's network. This noise prevents the second party from using the communication to decipher an encryption scheme of the first network while still allowing the communication to be transferred. This can also protect the first party since the second party cannot use the communication if the second party intercepts the first party's encrypted version of the communication.

The following includes definitions of selected terms employed herein. The definitions include various examples. The examples are not intended to be limiting.

"One embodiment", "an embodiment", "one example", "an example", and so on, indicate that the embodiment(s) or example(s) can include a particular feature, structure, characteristic, property, or element, but that not every embodiment or example necessarily includes that particular feature, structure, characteristic, property, or element. Furthermore, repeated use of the phrase "in one embodiment" may or may not refer to the same embodiment.

"Computer-readable medium", as used herein, refers to a medium that stores signals, instructions and/or data. Examples of a computer-readable medium include, but are not limited to, non-volatile media and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, other optical medium, a Random Access Memory (RAM), a Read-Only Memory (ROM), a memory chip or card, a memory stick, and other media from which a computer, a processor or other electronic device can read. In one embodiment, the computer-readable medium is a non-transitory computer-readable medium.

"Component", as used herein, includes but is not limited to hardware, firmware, software stored on a computer-readable medium or in execution on a machine, and/or combinations of each to perform a function(s) or an action(s), and/or to cause a function or action from another component, method, and/or system. Component may include a software controlled microprocessor, a discrete component, an analog circuit, a digital circuit, a programmed logic device, a memory device containing instructions, and so on. Where multiple components are described, it may be possible to incorporate the multiple components into one physical component or conversely, where a single component is described, it may be possible to distribute that single component between multiple components.

"Software", as used herein, includes but is not limited to, one or more executable instructions stored on a computer-readable medium that cause a computer, processor, or other electronic device to perform functions, actions and/or behave in a desired manner. The instructions may be embodied in various forms including routines, algorithms, modules, methods, threads, and/or programs, including separate applications or code from dynamically linked libraries.

FIG. 1 illustrates one embodiment of a communication environment 100 comprising a first secure network 110 and a second secure network 120. The networks 110 and 120 can comprise a plurality of radios 110R and 120R, respectively. In one embodiment, the first secure network 110 and the second secure network 120 are separate and distinct networks, meaning that they do not share radios with one another. The radios 110R can communicate with one another according to a first encryption scheme 1105. Similarly, the radios 120R can communicate with one another according to a second encryption scheme 1205 that is different from the first encryption scheme 1105 (e.g., the first encryption scheme 1105 can be more complex than the second encryption scheme).

However, there can be a desire for the first secure network 110 and the second secure network 120 to communicate with one another. In one embodiment, the networks 110 and 120 can transfer unencrypted communications between one another (e.g., via a direct cable connection). While this can result in successful communication, there can also be drawbacks.

Consider the following example that will be used throughout the detailed description. A natural disaster, such as a wild fire, can occur near a decently sized population center. The local community can send their local volunteer fire department (fire department) to help combat the fire. Additionally, the state governor can call-up the state National Guard (Guard) to also help combat the fire. The state National Guard can use the first secure network 110 while the volunteer fire department uses the second secure network 120. There can be many instances where the Guard and fire department would benefit in communicating with one another, such as to identify where the fire is most intense and in coordinating efforts.

One manner of communication can be unencrypted communication. This, however, can have drawbacks. In one example, the fire department can have foreign nationals or uncleared individuals serving as well as the possibility of the unencrypted communication being observed by a non-friendly third party. An undesirable party can obtain the unencrypted communication and use the unencrypted communication to help decipher the senders encryption scheme, such as the first encryption scheme 1105 of the Guard. Since the Guard can use the first encrypted scheme to communicate with other military units (e.g., other state National Guards, a Reserve component, or an Active component), compromising of the first encryption scheme 1105 can have devastating consequences. Therefore, while potentially available, direct unencrypted communication may not be desirable.

Additionally, different hardware can be used. In one example, the fire department can use different radios than the Guard. These radios can be relatively similar (e.g., the fire department uses model 123-A radios and the Guard uses model 123-B radios), be from different companies (e.g., the fire department uses radios from company ABC while the Guard uses radios from company XYZ), have vastly different functionality (e.g., the fire department uses a minimal feature radio while the Guard uses a high feature radio), etc. Further, the networks 110 and 120 can use different radios internally (e.g. the fire department is a joint team from multiple municipal fire departments with different municipalities employing different radios).

Figure 2:
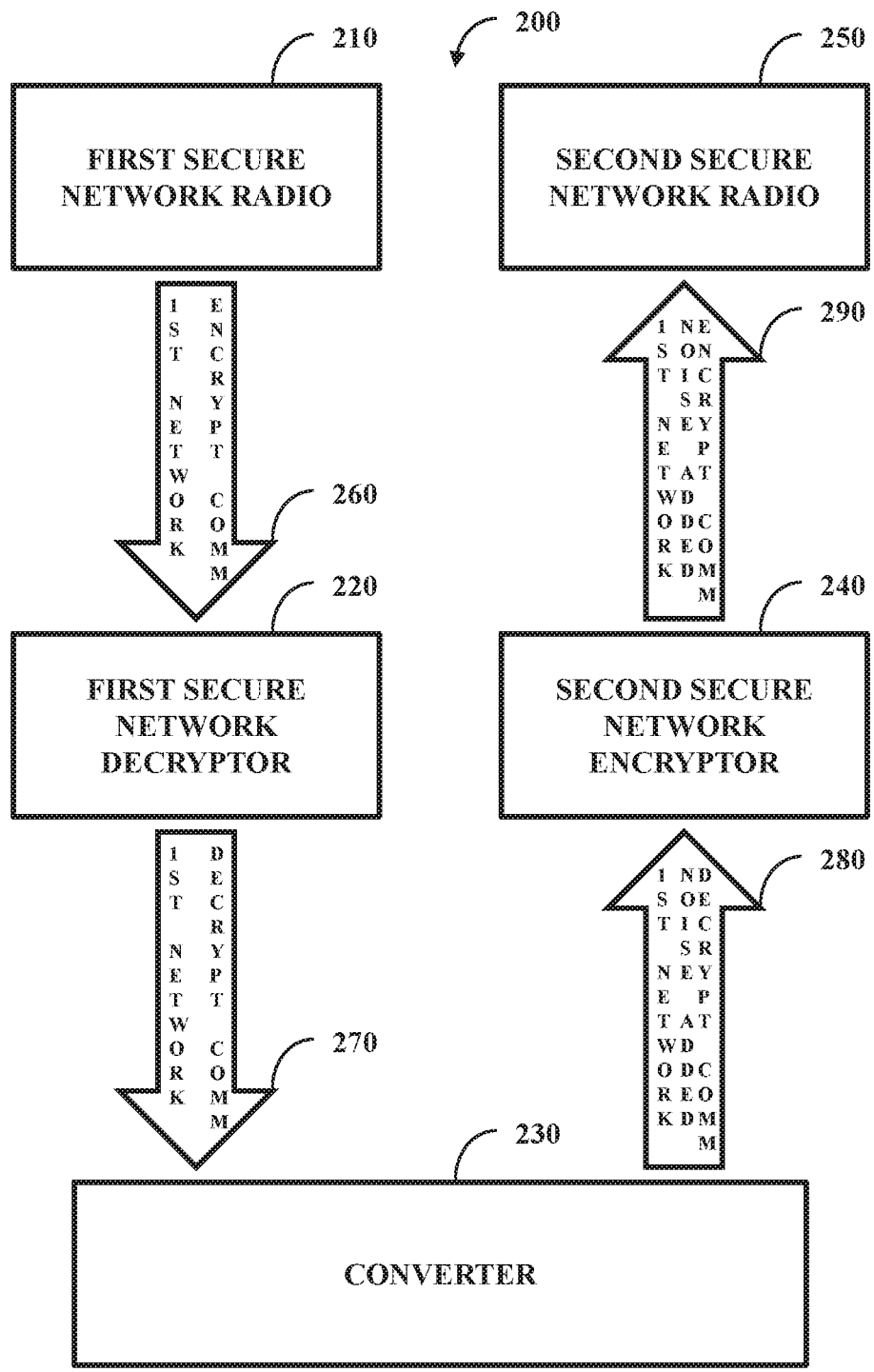
FIG. 2 illustrates one embodiment of a first secure network radio, a first secure network decryptor, a converter, a second secure network encryptor, and a second secure network radio.

FIG. 2 illustrates one embodiment of a first secure network radio 210, a first secure network decryptor 220, a converter 230, a second secure network encryptor 240, and a second secure network radio 250. In one embodiment, the decryptor 220 and the encryptor 240 can be stand-alone components (e.g., not radios). In one embodiment, the radio 250 can be one of the radios 120R of FIG. 1 and the encryptor 240 can be another one of the radios 120R of FIG. 1. The radio 210 can be one of the radios 110R of FIG. 1 and the decryptor 220 can be another one of the radios 110R of FIG. 1.

In one example, the radio 210 can be at a distance from a radio that functions as the decryptor 220. The radio 210 can send a first network encrypted communication 260 to the decryptor 220, such as sending the communication 260 wirelessly or by way of a hard-wired connection. The decryptor 220 can decrypt the communication 260 to produce a first network decrypted communication 270. The decryptor 220 can send the communication 270 to the converter 230, such as sending the communication 270 by way of a first hard wire channel.

The converter 230 can add noise to the communication 270, such as random white noise that is not at a level to be audible to the human ear, to produce a first network noise added decrypted communication 280. The communication 280 can be sent to the encryptor 240, such as by way of a second hard wire channel. The encryptor 240 can encrypt the communication 280 in accordance with the second encryption scheme 120S of FIG. 1. This can produce a first network noise added encryption communication 290. The encryptor 240 can send the communication 290 to the radio 250, such as sending the communication 290 wirelessly or by way of a hard-wired connection.

The radio 250 can therefore receive a communication from the radio 210 despite the radios 210 and 250 being part of different secure networks. Additionally, through the addition of the random noise, the second network is not able to use the communications 280 or 290 to learn the first encryption scheme 110S of FIG. 1. With the hard wire channels, the first secure network 110 of FIG. 1 and the second secure network 120 of FIG. 1 can both connect easily so that communications can be shared without compromising network security.

In one embodiment, the second network 120 of FIG. 1 does not use an encryption scheme. However, the first network 110 of FIG. 1 can still use the encryption scheme 110S of FIG. 1. Since it can still be a security risk for a user of the first network 110 of FIG. 1 to have unencrypted communications sent while also employing an encryption scheme, the converter 230 can be used to employ the noise. For communications from the second network 120 of FIG. 1, the noise can be added when transferred to the first network 110 of FIG. 1.

With an example scenario, the network 110 of FIG. 1 has two radios 110R of FIG. 1—Radio 1-A and Radio 1-B—and the network 120 of FIG. 1 has two radios 120R of FIG. 1—Radio 2-A and Radio 2-B. Two radios, one from each network 110 and 120, both of FIG. 1, can be collected and connected to the converter 230 to support retransmission (e.g., a separate converter unit or the radios 1-A and 2-B have components capable of performing conversion). If Radios 1-A and 2-A are selected, the audio out of Radio 1-A, that is decrypted baseband audio, can be connected to the audio in of Radio 2-A (e.g., directly connected or connected via a converter unit). The converter 230 can take decrypted baseband audio, modify the decrypted baseband audio, and output the modified baseband audio. The modification an include adding noise (e.g., adding white noise, adding a random signal, adding a wobble tone, or adding a random sub-audio tone) to the decrypted baseband audio or otherwise modifying the decrypted baseband audio.

Figure 3:
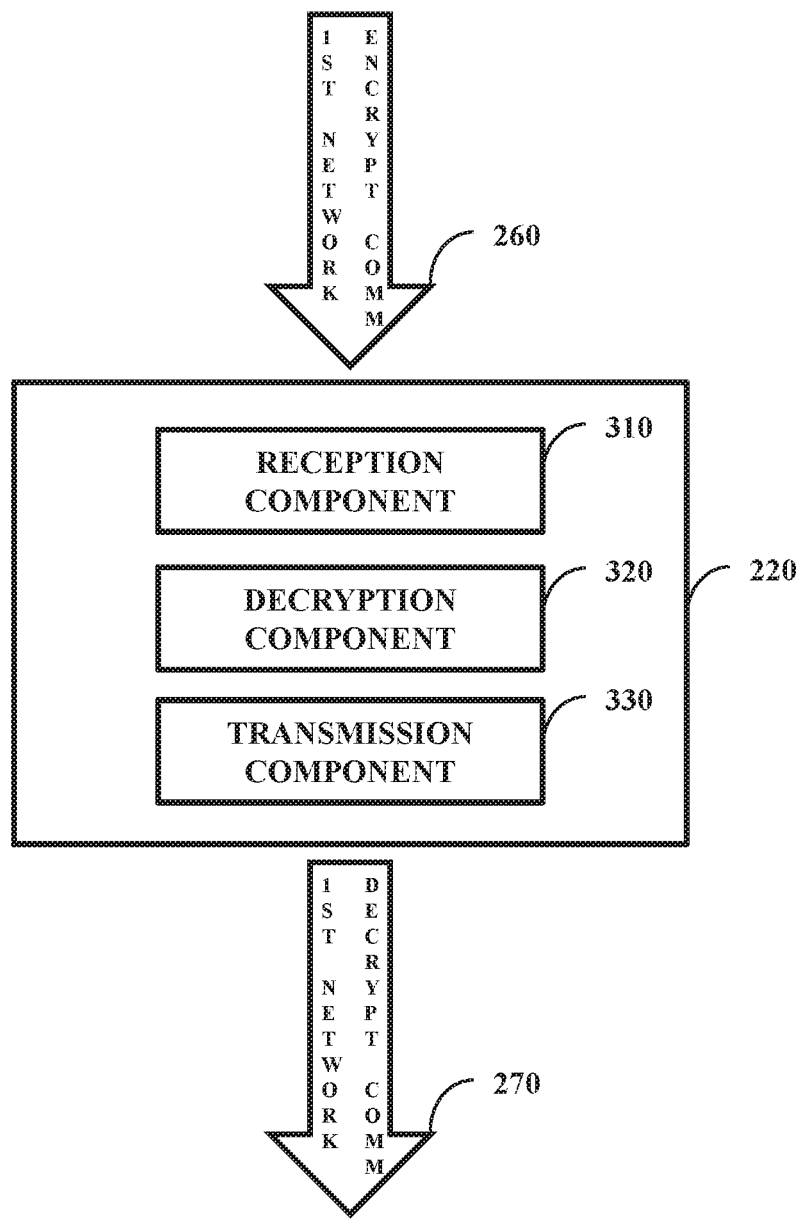
FIG. 3 illustrates one embodiment of the decryptor comprising a reception component, a decryption component, and a transmission component.

FIG. 3 illustrates one embodiment of the decryptor 220 comprising a reception component 310, a decryption component 320, and a transmission component 330. In one embodiment, the decryptor 220 is part of a radio (e.g., a radio with encryption and/or decryption capabilities). In one embodiment, the decryptor 220 is a stand-alone component (e.g., hard-wired to a physically separate radio).

The reception component 310 can be configured to receive an encrypted first secure network voice communication (e.g., the communication 260) with an intended destination of the second secure network 120 of FIG. 1. The decryption component 320 can be configured to decrypt the encrypted first secure network voice communication with the intended destination of the second secure network into a decrypted first secure network voice communication (e.g., the communication 270). The transmission component 330 can be configured to transmit the decrypted first secure network voice communication to a noise addition component (e.g., the converter 230 of FIG. 2).

At the noise addition component, random noise can be added and after the random noise is added the decrypted first secure network voice communication is transferred to the second secure network 120 of FIG. 1. The noise addition component can transfer the decrypted first secure network voice communication with noise added to the encryptor 240 of FIG. 2 for encryption in accordance with the second encryption scheme 120S of FIG. 1.

While above examples relate to the noise addition component as functioning with two networks, more than two networks can employ the converter. Returning to the fire department/National Guard scenario, a county sheriff can also become involved using communications equipment that functions off a third secure network with a third encryption scheme. The converter 230 of FIG. 2 can function commonly for the three parties to communicate together or three converters 230 of FIG. 2 can be employed for different communications among the secure networks (e.g., fire department-National Guard communication, fire department-county sheriff communication, and National Guard-county sheriff communication). In one embodiment, the third secure network can communicate with the first secure network 110 of FIG. 1, but not the second secure network 120 of FIG. 1.

The decrypted first secure network voice communication can be considered a first decrypted first secure network voice communication. The reception component 310 can be configured to receive an encrypted first secure network voice communication with an intended destination of a third secure network. The decryption component is configured to decrypt the encrypted first secure network voice communication with the intended destination of the third secure network into a second decrypted first secure network voice communication. The transmission component 330 can be configured to transmit the second decrypted first secure network voice communication to the noise addition component where random noise is added and after the random noise is added the second decrypted first secure network voice communication is transferred to the third secure network.

With this, the decryptor 220 can function as a router. A radio 110R can produce the communication 260. This communication 260 can include content as well as directional information communicated in a header. The decryptor 220 can read the header to determine the intended destination of the communication. Based on this, the decryptor 220 can send the communication to the appropriate converter 230 of FIG. 2. When a common converter 230 of FIG. 2 is used, the converter 230 of FIG. 2, in addition to modifying the audio stream, can function as the router and process header information (e.g., two communications sent—a non-noised added direction instruction sent from the converter 230 of FIG. 2 and the noise-added communication). However, aspects can be practiced without header information.

Figure 4:
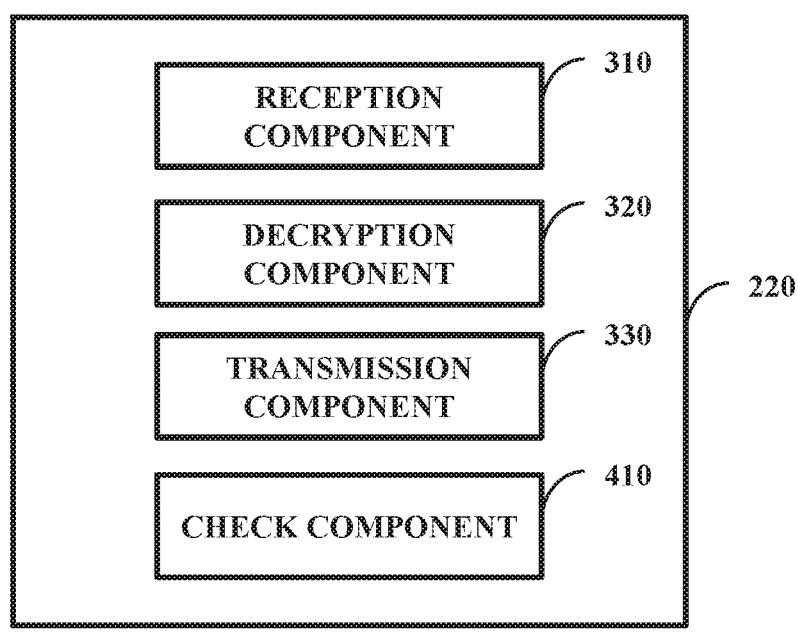
FIG. 4 illustrates one embodiment of the decryptor comprising the reception component, the decryption component, the transmission component, and a check component.

FIG. 4 illustrates one embodiment of the decryptor 220 comprising the reception component 310, the decryption component 320, the transmission component 330, and a check component 410. The check component 410 can be configured to perform a check as to whether the noise addition component has experienced a tampering. This check can be a self-diagnostic tool reviewing an access log, a scanner to see if physical hardware has been modified, a tester (e.g., testing if the noise added is random), etc. The check component 410 can function when the decryptor 220 initially engages with the converter 230 of FIG. 2 and/or periodically while engaged.

In one embodiment, the check can have an outcome that the converter 230 of FIG. 2 has experienced a tampering. In response to this, the check component can prevent the transmission component from transmitting the decrypted first secure network voice communication to the converter 230 of FIG. 2. Additionally or alternatively, an alert can be produced (e.g., a light flashes, a warning ton can be mixed into the audio signal, or a message can be sent to an administrator), such as upon detection of a tamper condition.

Figure 5:
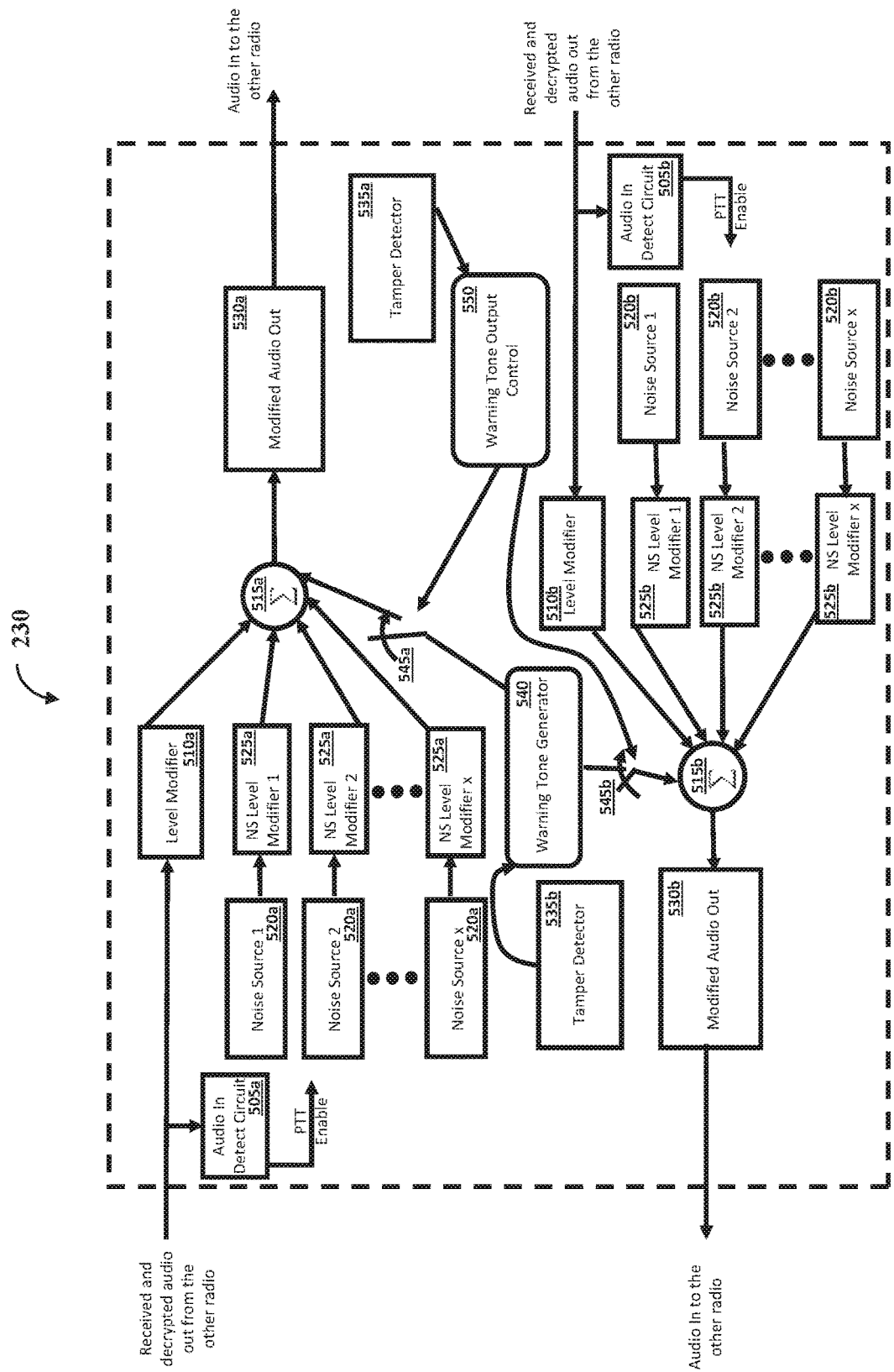
FIG. 5 illustrates one embodiment of the converter.

FIG. 5 illustrates one embodiment of the converter 230. When push-to-talk (PTT) is selected by a user, an audio in detect circuit 505a can allow PTT communication such that the unencrypted communication (e.g., baseband audio) from the first network 110 of FIG. 1 to be received as a level modifier 510. The level modifier 510a can send the signal to a summing circuit 515. A set of noise sources 520a (one or more noise sources) can provide random noise as noise modifiers 525a that in turn also feed to the summing circuit 515a (e.g., summing amplifier). The noise modifiers 525a can be varied over time and/or multiple sources can be engaged over times in random ways so the randomness is not only in the noise itself, but can also be random over time. The summing circuit 515a can produce a modified audio out 530a (e.g., the communication 280 of FIG. 2) by summing audio output from the level modifier 510a with noise signal outputs from the noise modifiers 525a. The modified audio out 530a can be sent to the second network 120 of FIG. 1 for encryption.

The converter 230 can be multi-directional. In one example, 505a-530a can be mirrored as 505b-530b for communication from the second network 120 of FIG. 1 to the first network 110 of FIG. 1. While two networks are discussed, more complex implementations can be practiced, such as the converter 230 facilitating communication to three or more networks or facilitating limited communication among networks (e.g., a primary network communicating with a secondary network and a tertiary network, but not facilitating communication between the secondary network and the tertiary network). In one embodiment, items of the converter 230 can be combined (e.g., a single set of noise modifiers can be used as opposed to two sets 520a and 520b).

In one embodiment, the converter 230 can include tamper resistant features. A tamper detector set 535a and 535b (e.g., a single tamper detector) can detect that the converter 230 and/or an associated radio has been tampered with such that security may be compromised. A warning tone generator 540 can function to add a warning tone (e.g., human audible tone at predetermined level and/or frequency) to an outgoing communication notifying a user that the converter has been tampered with. The additional warning tone can be input to the summing circuits 515a and 515b.

In one embodiment, a set of switches 545a and 545b can be employed to regulate addition of the warning tone. The switches 545a and 545b can remain open. In one example, when the tamper detector 535a determines tampering has occurred, a warning tone output control 550 (e.g., a controller) can cause the switch 545a to close. This closing can cause the warning tone generator 540 to send a tone that arrives at the summing circuit 515a for summation. This summation can cause the audio output to have a warning tone. The warning tone can alert a listener or a receiving radio that the converter 230 may have been compromised. In view of this, the receiving network may not elect to encrypt the output with its encryption scheme or continue communicating since the noise added may not be random and therefore may pose a security threat.

Figure 6:
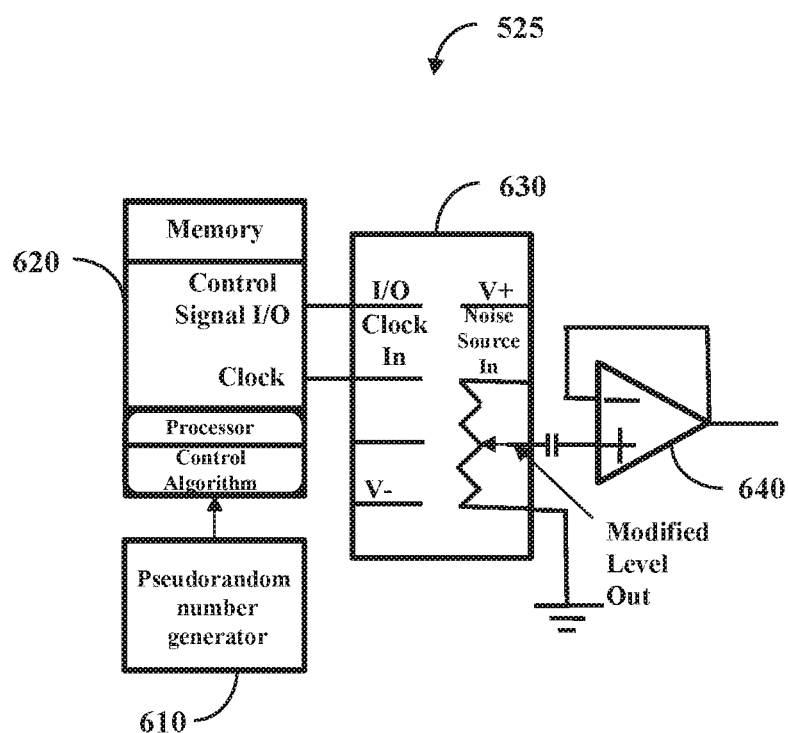
FIG. 6 illustrates one embodiment of the noise source level modifier comprising a pseudorandom number generator, a controller, a digital potentiometer, and a voltage follower.

FIG. 6 illustrates one embodiment of the noise source level modifier 525 comprising a pseudorandom number generator 610, a controller 620, a digital potentiometer 630, and a voltage follower 640. This noise source level modifier can vary amplitude of the noise for added variance (e.g., noise is added and amplitude of the noise is varied over time). The pseudorandom number generator 610 can generate a pseudorandom number and this number is provided to the controller 620 along with a clock signal. The controller 620 can employ a processor and memory to produce a control I/O signal. The control algorithm of the controller 620 takes the number and uses it to vary the produced control I/O signal. The varied control I/O signal is supplied to the potentiometer 630 and since the control I/O signal is varied, the resistance of the potentiometer is varied. The potentiometer 630 can be controlled by the control I/O signal received to produce a modified level out. The modified level out can be fed to a blocking capacitor (e.g., if appropriate). The output of the blocking capacitor can be put into the non-inverting terminal of the voltage follower 640. The output of voltage follower 640 is input to the desired summing circuit (e.g., summing circuit 515a of FIG. 5).

Protections can be put into place so that the output of the voltage follower 640 remains random. In one embodiment, the control algorithm can function with a capping feature to ensure randomness. The control algorithm can be supplied with a maximum value threshold and a minimum value threshold. If the modified level out reaches either the maximum or minimum, then the control algorithm can cause a respective drop or rise so that the potentiometer 630 does not become stuck and an extreme value (and therefore losing randomness).

Figure 7:
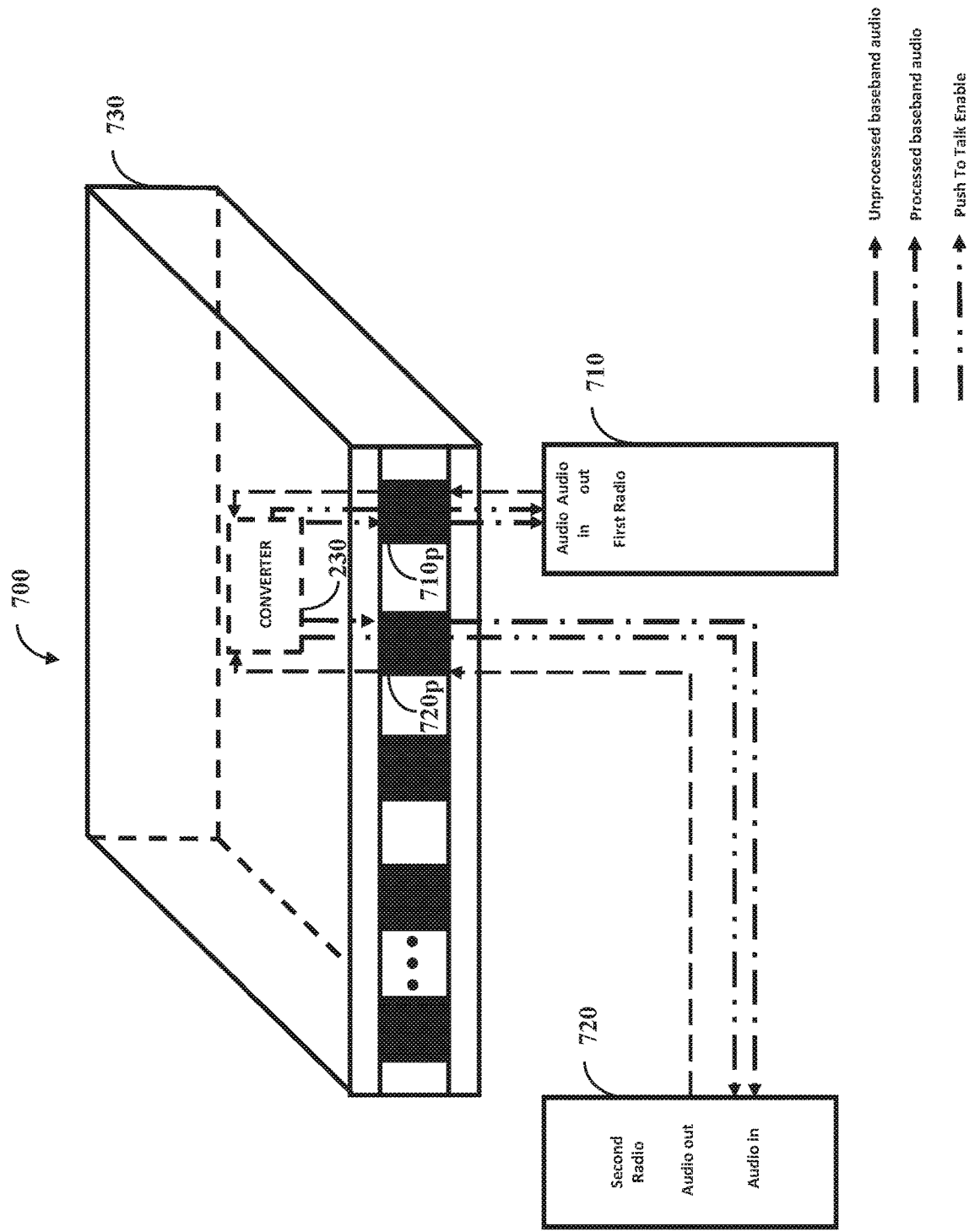
FIG. 7 illustrates one embodiment of an environment with a first radio and a second radio that communicate with an intermediary hardware unit.

FIG. 7 illustrates one embodiment of an environment 700 with a first radio 710 (e.g., a radio 110R of FIG. 1 on the first secure network 110 of FIG. 1) and a second radio 720 (e.g., a radio 120R of FIG. 1 on the first secure network 120 of FIG. 1) that communicate with an intermediary hardware unit 730. The connections between the unit 730 and the radios 710 and 720 can be hardwired, movable physical wires, etc. In one example, with the movable physical wires, the wires can connect with audio ports 710p and 720p (e.g., one in and one out wire for each port, a single out and multiple in wires, a common wire for in and out, etc.). The unit 730 can comprise the converter 230 and use the ports 710p and 720p along with the converter 230 to facilitate communication between the radios 710 and 720.

Figure 8:
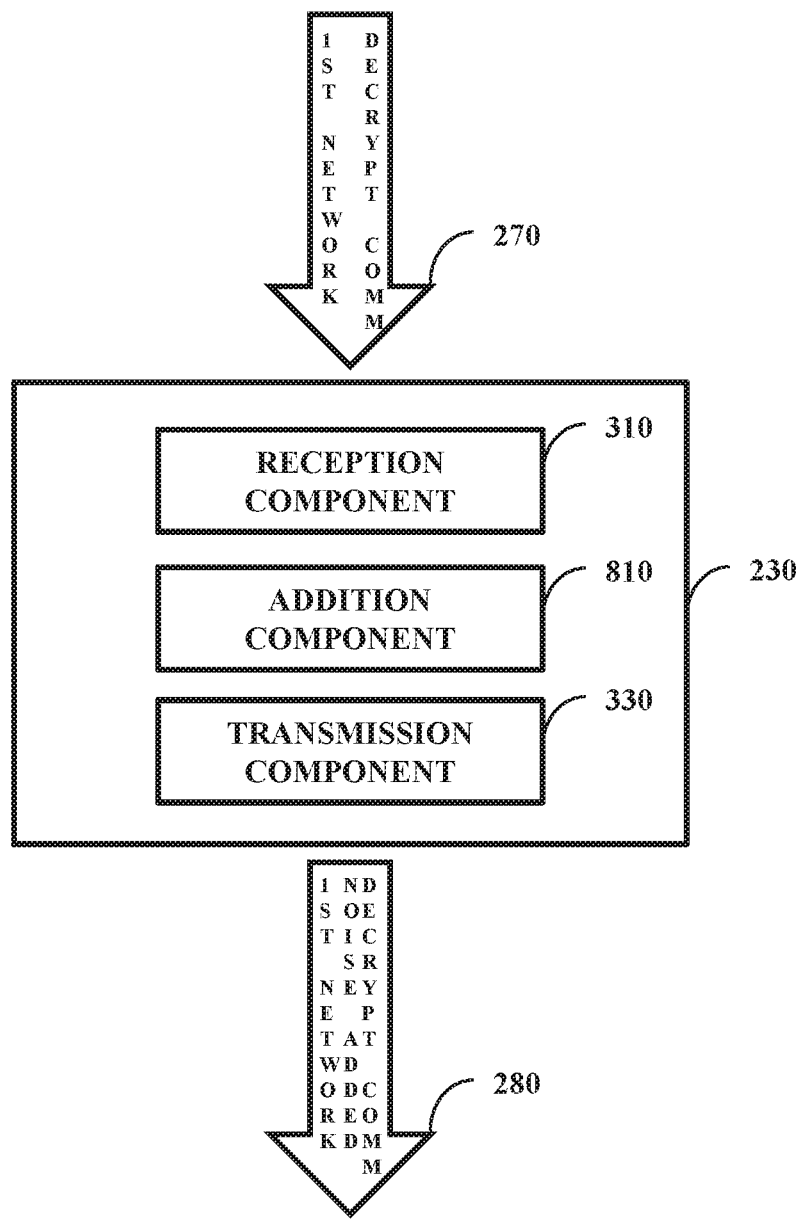
FIG. 8 illustrates one embodiment of the converter comprising the reception component, an addition component, and the transmission component.

FIG. 8 illustrates one embodiment of the converter 230 comprising the reception component 310, an addition component 810, and the transmission component 330. The reception component 310 can be configured to receive a non-encrypted voice communication (e.g., the communication 270) from a first secure radio network (e.g., the first secure network 110 of FIG. 1). The addition component 810 can be configured to add random noise to the non-encrypted voice communication from the first secure radio network such that a first secure radio network-based noise-added non-encrypted voice communication (e.g., the communication 280) is produced. The transmission component 330 can be configured to transmit the first secure radio network-based noise-added non-encrypted voice communication to a second secure radio network (e.g., the second secure network 120 of FIG. 1).

Figure 9:
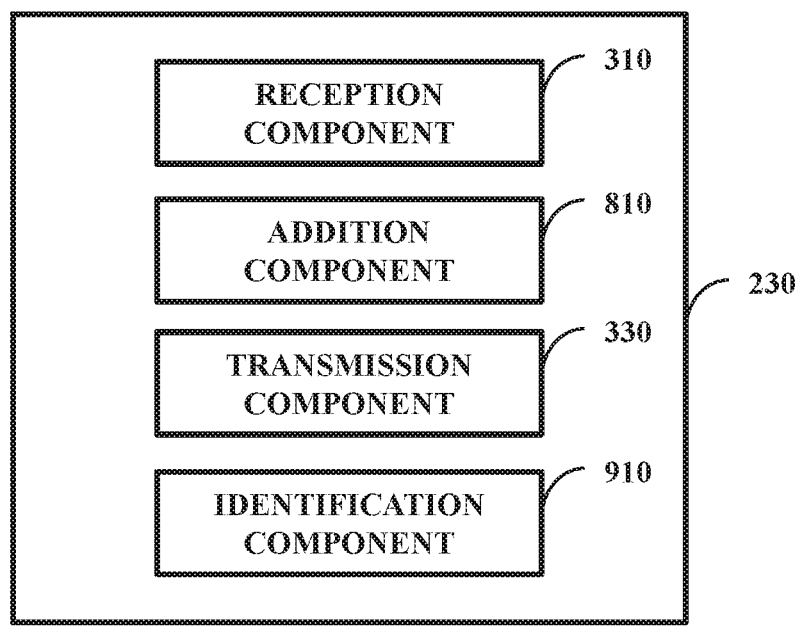
FIG. 9 illustrates one embodiment of the converter comprising the reception component, the addition component, the transmission component, and an identification component.

FIG. 9 illustrates one embodiment of the converter 230 comprising the reception component 310, the addition component 810, the transmission component 330, and an identification component 910. The identification component 910 can be configured to determine a communication destination between the second secure radio network and a third secure radio network. The transmission component 330 can be configured to transmit the first secure radio network-based noise-added non-encrypted voice communication to the second secure radio network when the determination is that the communication destination is the second secure radio network. Similarly, the transmission component 330 can be configured to transmit the first secure radio network-based noise-added non-encrypted voice communication to the third secure radio network when the determination is that the communication destination is the third secure radio network.

The reception component 310, addition component 810, and transmission component 330 can do the same for communications from the second secure network to the first secure network as well as other networks (e.g., a third secure network). Additionally, networks can share radios so that a radio is part of more than one network (e.g., the radio being shared between networks supports multiple transmission and/or reception capabilities, such as being capable of storing and processing multiple keys). Returning to the fire example, three networks can be used the Guard, the Fire Department, and a regular Army unit (Army), such as from a corps of engineers. A specific radio can be configured to communicate on the Army network and the Guard network. When the transmission component 330 transmits the communication 280 to the specific radio there can be header information to know what network the communication is intended for. In response to this, the radio can encrypt accordingly.

Figure 10:
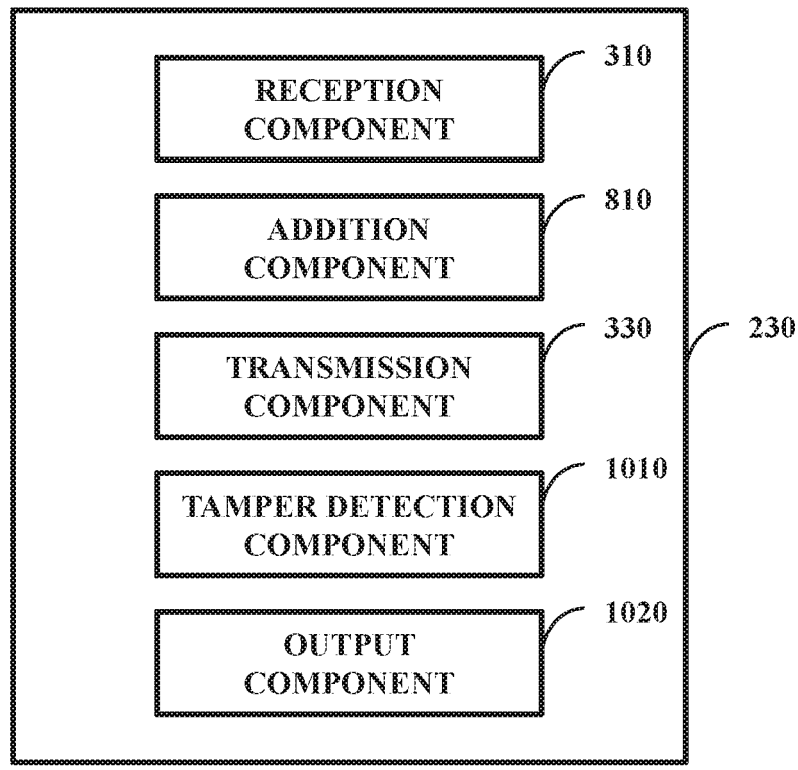
FIG. 10 illustrates one embodiment of the converter comprising the reception component, the addition component, the transmission component, a tamper detection component, and an output component.

FIG. 10 illustrates one embodiment of the converter 230 comprising the reception component 310, the addition component 810, the transmission component 330, a tamper detection component 1010, and an output component 1020. The tamper detection component 1010 (e.g., the tamper detector set 535a of FIG. 5) can be configured to make a determination if the addition component 810 is tampered with such that the random noise is not added to the non-encrypted voice communication from the first secure radio network. The output component 1020 (e.g., the warning tone generator 540 of FIG. 5, the set of switched 545a and 545b of FIG. 5, the warning tone output control 550 of FIG. 5, or a combination thereof) can be configured to output an indicator when the determination is that tampering has occurred.

In one example, the indicator is a light that flashes on an outside of housing of the converter 230. With this, a user can be alerted that the converter 230 may have experienced a tampering. However, the user may want to still use the converter 230. For example, in the fire scenario, the need for emergency rescue may be so great that it outweighs security concerns. Using a light can alert parties that security may be comprised and therefore the parties may want to be mindful of what is said since communication may be compromised. Using the light as a tamper indicator can allow the communication to continue unchanged (as opposed to when a human-audible tone is added).

Figure 11:
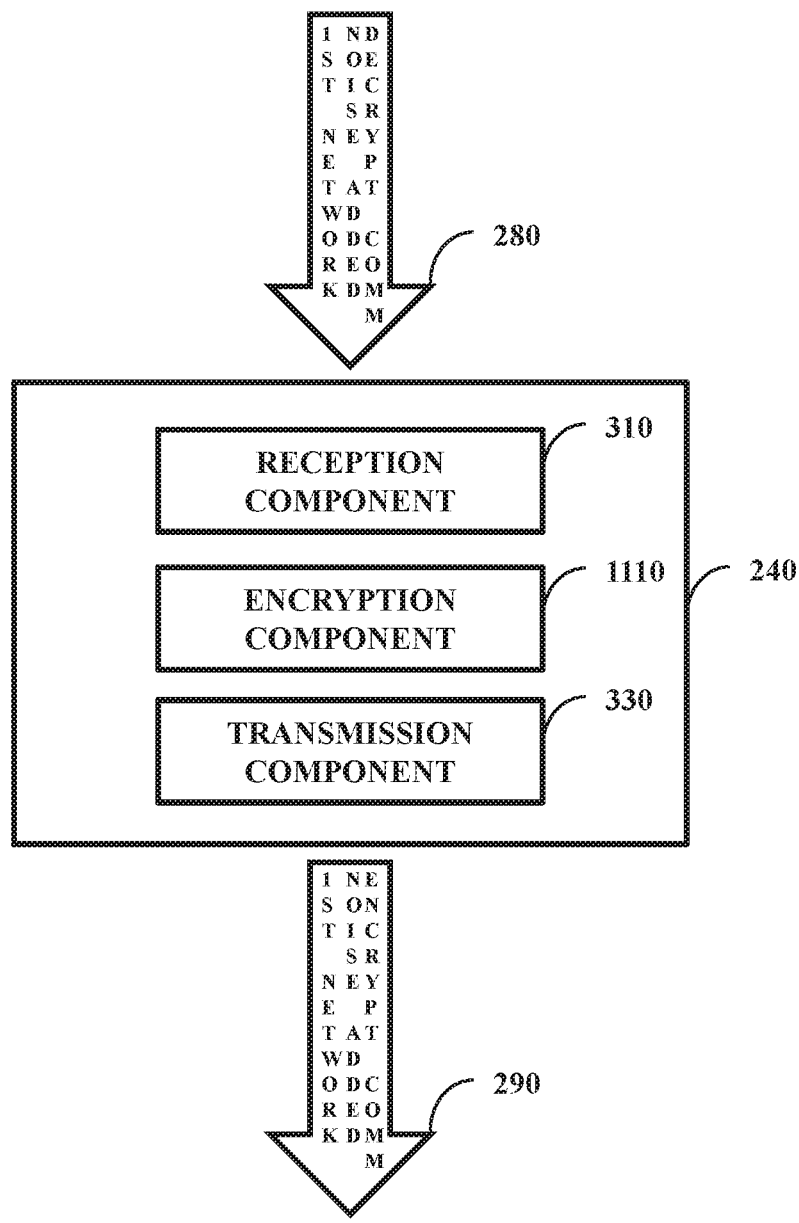
FIG. 11 illustrates one embodiment of the encryptor comprising the reception component, an encryption component, and the transmission component.

FIG. 11 illustrates one embodiment of the encryptor 240 comprising the reception component 310, an encryption component 1110, and the transmission component 330. The reception component 310 can be configured to receive a random noise-added first network-based non-encrypted voice communication (e.g., the communication 280) by way of a non-encrypted communication channel (e.g., hardwire channel). The encryption component 1110 can be configured to encrypt, according to the second network encryption scheme 120S of FIG. 1, the random noise-added first secure network-based non-encrypted voice communication into an encrypted first secure network voice communication (e.g., the communication 290). The transmission component 330 can be configured to transmit the encrypted first secure network voice communication along the second secure network 110 of FIG. 1.

The encryptor 240 can be part of a radio 110R and/or 120R of FIG. 1, so messages, such as voice communications, can transfer both from the first network 110 of FIG. 1 to the second network 120 of FIG. 1 and from the second network 120 of FIG. 1 to the first network 110 of FIG. 1. Similarly, the encryptor 240 can receive messages from multiple secure networks. These multiple messages can be received from, and have noise added by, a single noise addition component (e.g., the converter 230 of FIG. 2).

Conversely, these multiple messages can be received from different noise addition components (e.g., different converters). In one example, a single radio can connect with multiple converters. This can allow the single radio that functions on a first secure radio network to communicate with a second secure radio network by way of a first converter and to communicate with a third secure radio network by way of a second converter distinct and separate from the first converter. This can allow the first secure radio network to communicate with the second and third secure radio networks. This can take place with or without the second secure radio network and the third secure radio network directly communicating with one another (e.g., the first secure radio network can function as a pass through to facilitate communication between the second secure radio network and the third secure radio network when direct communication is unavailable).

In one embodiment, the encryptor 240 can employ the check component 410 of FIG. 4 to perform a check as to whether a source of the random noise-added second secure network-based non-encrypted voice communication has experienced tampering. In one example, a message can be received and the encryptor 240 can determine if tampering has occurred. If tampering has occurred, then the message can be deleted, be sent along without encryption, etc. If tampering has not occurred, the encryptor 240 can read an intended destination (e.g., a destination radio of the receiving network), subject the message to the encryptor's encryption scheme, and send the message to the intended destination (e.g., directly or by way of relay).

Figure 12:
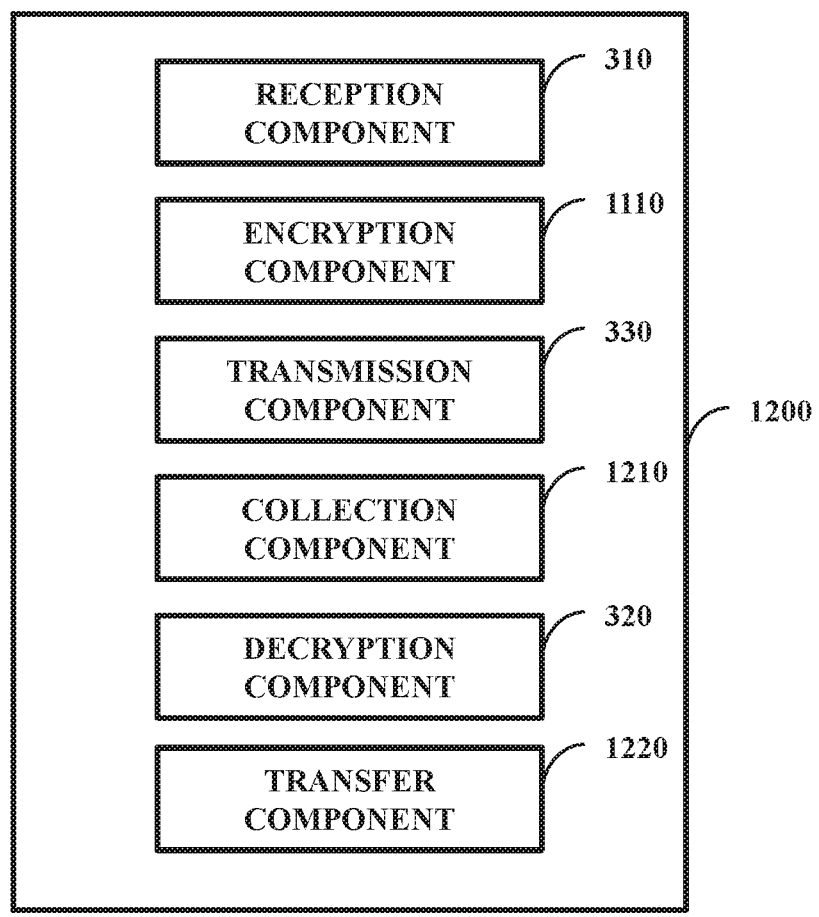
FIG. 12 illustrates one embodiment of a system comprising the reception component, the encryption component, the transmission component, a collection component, the decryption component, and a transfer component.

FIG. 12 illustrates one embodiment of a system 1200 comprising the reception component 310, the encryption component 1110, the transmission component 330, a collection component 1210, the decryption component 320, and a transfer component 1220. The system 1200 can function as a radio with the encryptor 240 of FIG. 2 (e.g., the reception component 310, the encryption component 1110, and the transmission component 330) and the decryptor 220 of FIG. 2 (e.g., the collection component 1210, the decryption component 320, and the transfer component 1220). This allows a single radio to be able to decrypt communications that are leaving the radio's network and encrypt communications that are entering the radio's network.

The collection component 1210 can be configured to collect a network outgoing communication that originates within a secure network of the system 1200 when functioning as a radio. The decryptor component 320 can decrypt the network outgoing communication. The transfer component 320 can transfer, by way of a non-encrypted communication channel, the decrypted communication to the converter 230 of FIG. 2.

Figure 13:
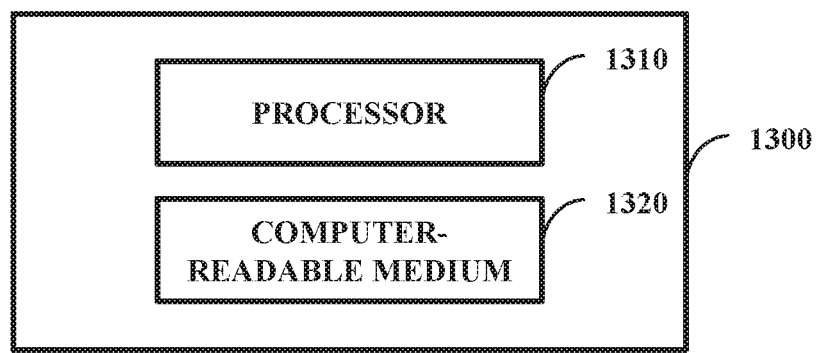
FIG. 13 illustrates one embodiment of a system comprising a processor and a computer-readable medium.

FIG. 13 illustrates one embodiment of a system 1300 comprising a processor 1310 (e.g., a general purpose processor, a processor specifically designed for performing a functionality disclosed herein, etc.) and a computer-readable medium 1320 (e.g., non-transitory computer-readable medium). In one embodiment, the computer-readable medium 1320 is communicatively coupled to the processor 1310 and stores a command set executable by the processor 1310 to facilitate operation of at least one component disclosed herein (e.g., the decryption component 320 of FIG. 3). In one embodiment, at least one component disclosed herein (e.g., the transmission component 330 of FIG. 3) can be implemented, at least in part, by way of non-software, such as implemented as hardware by way of the system 1300. In one embodiment, the computer-readable medium 1320 is configured to store processor-executable instructions that when executed by the processor 1310, cause the processor 1310 to perform a method disclosed herein (e.g., the methods 1400-1800 addressed below).

Figure 14:
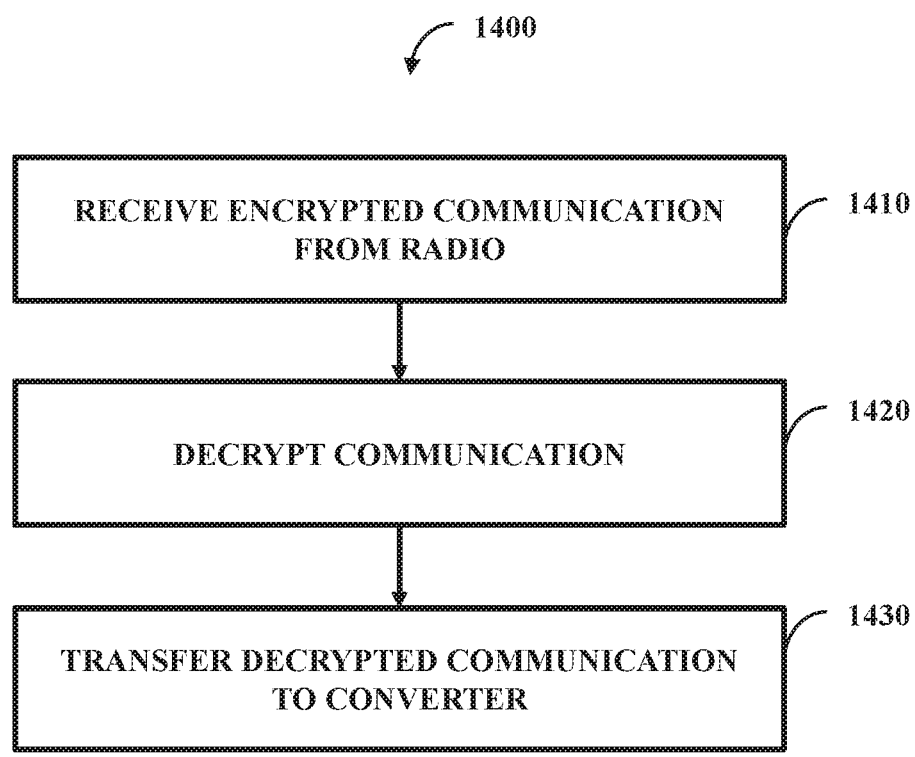
FIG. 14 illustrates one embodiment of a method comprising three actions.

FIG. 14 illustrates one embodiment of a method 1400 comprising three actions 1410-1430. The method 1400 can, in one example, be performed by a radio 110R of FIG. 1 by way of the decryptor 220 of FIG. 2. At 1410, an encrypted communication can be received. At 1420, the received encrypted communication can be decrypted. At 1430, the decrypted communication can be transferred to the converter 230 of FIG. 2.

Figure 15:
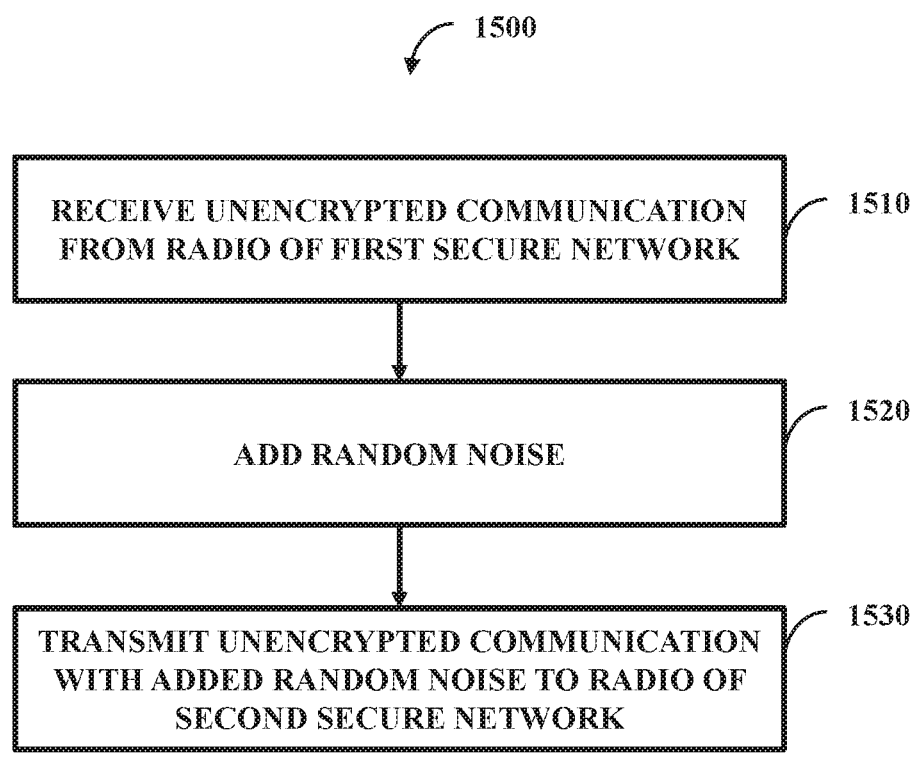
FIG. 15 illustrates one embodiment of a method comprising three actions.

FIG. 15 illustrates one embodiment of a method 1500 comprising three actions 1510-1530. The method 1500 can, in one example, be performed by the converter 230 of FIG. 2. There can be, at 1510 receiving an unencrypted communication from a radio 110R of FIG. 1 of the first secure network 110 of FIG. 1. At 1520, random noise (e.g., white noise) can be added to the unencrypted communication. At 1530, the unencrypted communication with added random noise can be transmitted to the second secure network 120 of FIG. 1.

Figure 16:
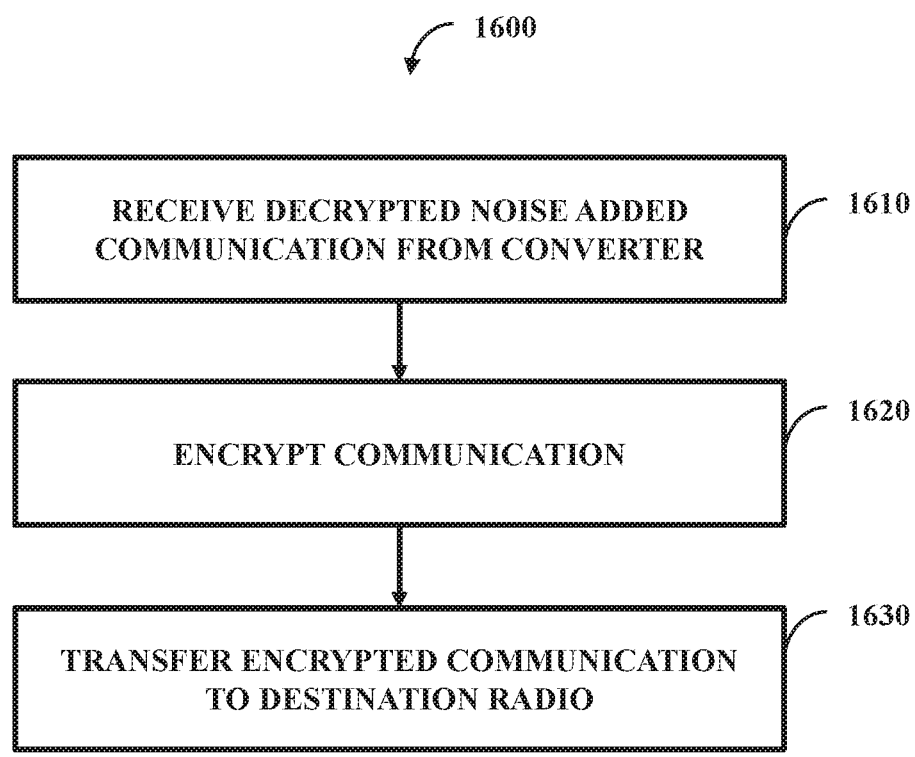
FIG. 16 illustrates one embodiment of a method comprising three actions.

FIG. 16 illustrates one embodiment of a method 1600 comprising three actions 1610-1630. The method 1600 can, in one example, be performed by a radio 110R of FIG. 1 by way of the encryptor 240 of FIG. 2. At 1610, a decrypted white noise added communication can be received from the converter 230 of FIG. 2. At 1620, the received communication can be encrypted along with the white noise. At 1630, the encrypted communication can be transferred to a destination radio. The destination radio can be part of the same secure network as the radio performing the method 1600.

Figure 17:
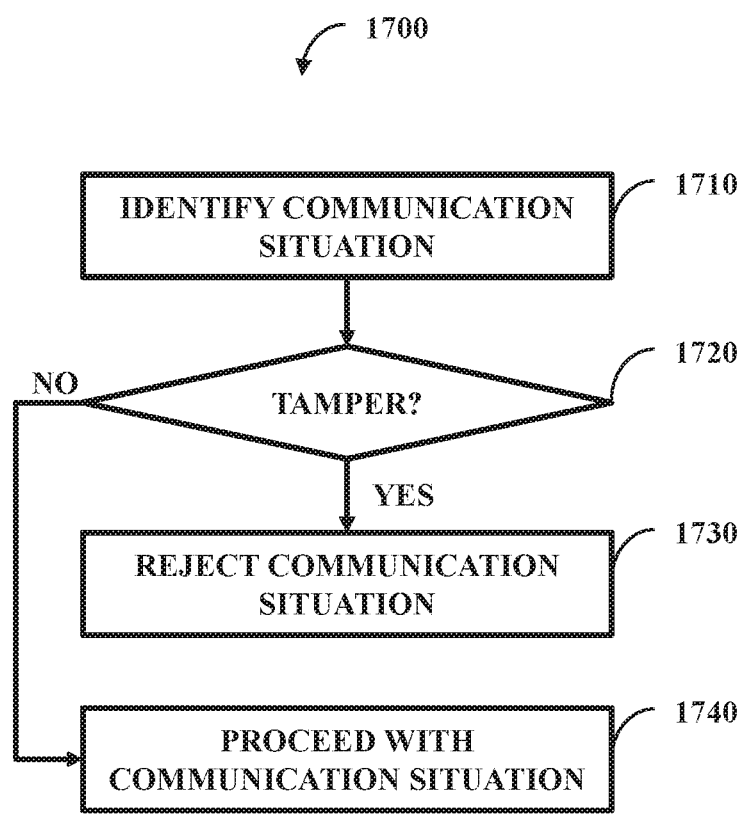
FIG. 17 illustrates one embodiment of a method comprising four actions.

FIG. 17 illustrates one embodiment of a method 1700 comprising four actions 1710-1730. The method 1700 can, in one example, be performed by the converter 230 of FIG. 2. At 1710, a communication situation can be identified, such as receiving a communication designated for white noise addition (e.g., receive the communication along a dedicated hardwire channel). At 1720, a check can be performed to determine if the converter 230 of FIG. 2 has experienced a tampering (e.g., physical tampering to the converter 230 of FIG. 2 or software tampering/a software tampering attack occurs to the converter 230 of FIG. 2). If so, then the situation can be rejected at 1730 or alternative arrangements made (e.g., the communication is moved forward, but with a notification of the tampering such as an addition of a warning tone). If tampering is not detected, then the communication situation can proceed as normal.

Figure 18:
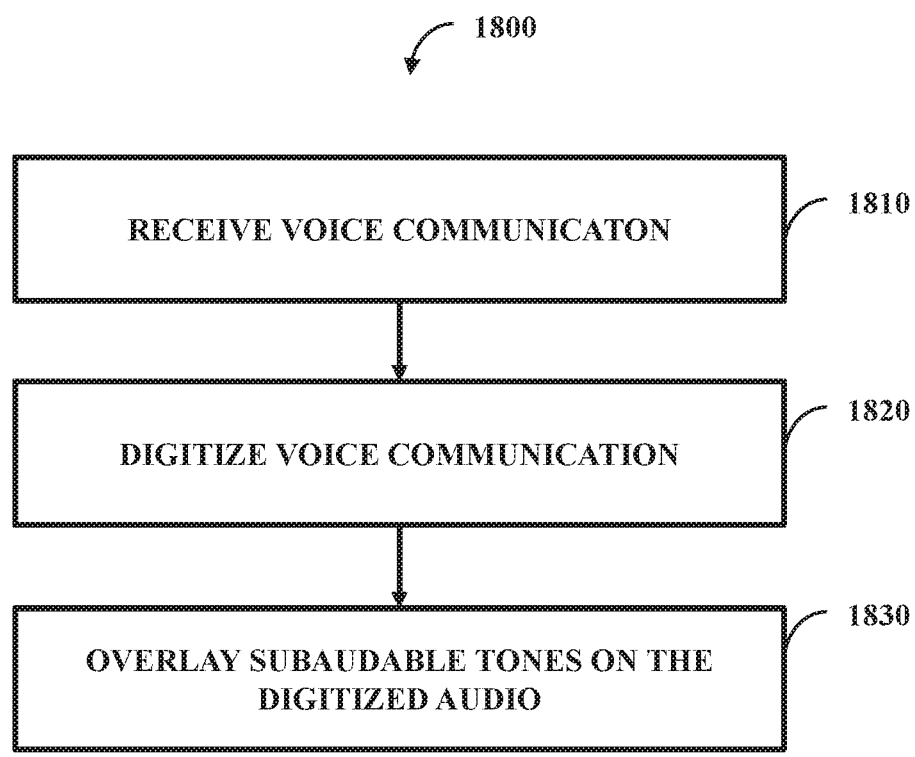
FIG. 18 illustrates one embodiment of a method comprising three actions.

FIG. 18 illustrates one embodiment of a method 1800 comprising three actions 1810-1830. The method 1800 can, in one example, be performed by the converter 230 of FIG. 2. At 1810, a voice communication can be received. At 1820, the voice communication can be digitized. At 1830, subaudible tones can be overlaid on the digitized audio. These subaudible tones can be the noise or can be the notification of the tampering.

While the example of the military and fire department is used throughout the detailed description, one should appreciate that this technology can have application in a wide variety of fields. One example includes allowing two companies to communicate with one another, including non-audio communication, by adding random values to a communication. Another example includes allowing two military forces from different nations to communicate with one another.

While the methods disclosed herein are shown and described as a series of blocks, it is to be appreciated by one of ordinary skill in the art that the methods are not restricted by the order of the blocks, as some blocks can take place in different orders. Similarly, a block can operate concurrently with at least one other block.

What is claimed is:
1. A system, that is at least partially hardware, comprising:
  a reception component configured to receive a non-encrypted voice communication from a first secure radio network;
  an addition component configured to add random noise to the non-encrypted voice communication from the first secure radio network such that a first secure radio network-based noise-added non-encrypted voice communication is produced; and a transmission component configured to transmit the first secure radio network-based noise-added non-encrypted voice communication to a second secure radio network.

2. The system of claim 1,
where the reception component is configured to receive a non-encrypted voice communication from the second secure radio network,
where the addition component is configured to add random noise to the non-encrypted voice communication from the second secure radio network such that a second secure radio network-based noise-added non-encrypted voice communication is produced, and
where the transmission component is configured to transmit the second secure radio network-based noise-added non-encrypted voice communication to the first secure radio network.

3. The system of claim 2,
where the reception component is configured to receive a non-encrypted voice communication from a third secure radio network,
where the addition component is configured to add random noise to the non-encrypted voice communication from the third secure radio network such that a third secure radio network-based noise-added non-encrypted voice communication is produced, and
where the transmission component is configured to transmit the third secure radio network-based noise-added non-encrypted voice communication to the first secure radio network.

4. The system of claim 1,
where the first secure radio network employs a first voice communication encryption scheme,
where the second secure radio network employs a second voice communication encryption scheme, and
where the first voice communication encryption scheme and the second voice communication encryption scheme are different voice communication encryption schemes.

5. The system of claim 1, comprising:
an identification component configured to determine a communication destination between the second secure radio network and a third secure radio network;
where the transmission component is configured to transmit the first secure radio network-based noise-added non-encrypted voice communication to the second secure radio network when the determination is that the communication destination is the second secure radio network and
where the transmission component is configured to transmit the first secure radio network-based noise-added non-encrypted voice communication to the third secure radio network when the determination is that the communication destination is the third secure radio network.

6. The system of claim 1, comprising:
a tamper detection component configured to make a determination if the addition component is tampered with such that the random noise is not added to the non-encrypted voice communication from the first secure radio network; and
an output component configured to output an indicator when the determination is that tampering has occurred.

7. The system of claim 1,
where the addition component is configured to add the random noise by summation of a random noise signal with the non-encrypted voice communication and
where the random noise is a noise signal produced from a noise source.

8. The system of claim 1,
where the reception component is configured to receive a first random noise signal from a first random noise source,
where the reception component is configured to receive a second random noise signal from a second random noise source distinct from the first random noise source,
where the addition component is configured to randomly modify an amplitude of the first random noise signal to produce an amplitude-modified first random noise signal,
where the addition component is configured to randomly modify an amplitude of the second random noise signal to produce an amplitude-modified second random noise signal,
where the addition component is configured to add the random noise by summation of the amplitude-modified first random noise signal, the amplitude-modified second random noise signal, and the non-encrypted voice communication.

9. The system of claim 1,
where the reception component is configured to receive the non-encrypted voice communication from a first secure radio network by way of a first wired connection,
where the transmission component is configured to transmit the first secure radio network-based noise-added non-encrypted voice communication to the second secure radio network by way of a second wired connection, and
where the first wired connection and the second wired connection are separate and distinct.

10. The system of claim 1,
where the first radio network and the second radio network are separate and distinct radio networks.

11. The system of claim 1,
where the random noise is non-audible to the human ear.

12. The system of claim 1,
where the first secure radio network employs an encryption scheme and where the second secure radio network functions in an unencrypted manner.

13. The system of claim 1,
where the non-encrypted voice communication from the first secure radio network is decrypted from an encrypted voice communication at the first secure radio network.

14. The system of claim 1,
where the first secure radio network-based noise-added non-encrypted voice communication is encrypted at the second secure radio network.

15. The system of claim 1,
where the addition component adds a header to the non-encrypted voice communication indicating a destination of the second secure radio network and not a third secure radio network, and
where the transmission component is configured to transmit the first secure radio network-based noise-added non-encrypted voice communication to the second secure radio network with the header.

16. The system of claim 1, comprising:
a tamper detection component configured to make a determination if a radio that is part of the first secure communication network is tampered with; and
an output component configured to output an indicator when the determination is that tampering has occurred,
where the addition component adds a detail to the non-encrypted voice communication that designates the indicator, and
where the transmission component is configured to transmit the first secure radio network-based noise-added non-encrypted voice communication to the second secure radio network with the detail.

17. The system of claim 6,
where the addition component adds a detail to the non-encrypted voice communication that designates the indicator, and
where the transmission component is configured to transmit the first secure radio network-based noise-added non-encrypted voice communication to the second secure radio network with the detail.

18. The system of claim 6,
where the indicator is an audio indicator audible to a human ear,
where the addition component adds the audio indicator to the non-encrypted voice communication such that the transmission component is configured to transmit the first secure radio network-based noise-added non-encrypted voice communication to a second secure radio network as a first secure radio network-based noise-added and indicator-added non-encrypted voice communication.

19. The system of claim 6,
a light; and
a housing configured to retain the reception component, the addition component, the transmission component, the tamper component, and the light,
where the indicator is the activation of the light.

20. The system of claim 7,
where the random noise signal is within a set frequency range consistent with a warning tone.

\* \* \* \* \*